United States Patent
Sabin et al.

(10) Patent No.: US 8,948,399 B2
(45) Date of Patent: Feb. 3, 2015

(54) DYNAMIC KEY MANAGEMENT

(75) Inventors: Jason Allen Sabin, Lehi, UT (US); Michael John Jorgensen, Mapleton, UT (US)

(73) Assignee: Novell, Inc., Provo, UT (US)

( * ) Notice: Subject to any disclaimer, the term of this patent is extended or adjusted under 35 U.S.C. 154(b) by 356 days.

(21) Appl. No.: 13/118,082

(22) Filed: May 27, 2011

(65) Prior Publication Data

US 2012/0300940 A1 Nov. 29, 2012

(51) Int. Cl.
*H04L 9/08* (2006.01)
*H04L 29/06* (2006.01)

(52) U.S. Cl.
CPC ............ *H04L 9/0891* (2013.01); *H04L 63/06* (2013.01)
USPC ........................................................ 380/282

(58) Field of Classification Search
CPC .............. G06F 9/455; G06F 9/45533; G06F 17/30165; G06F 21/00; G06F 21/44; G06F 9/5077; G06F 11/0712; G06F 17/30067; H04L 63/08; H04L 63/20; H04L 63/10; H04L 9/28; H04L 63/0823; H04L 47/70
USPC ........................................................ 380/282
See application file for complete search history.

(56) References Cited

U.S. PATENT DOCUMENTS

| | | | |
|---|---|---|---|
| 5,761,306 A * | 6/1998 | Lewis ........................... 380/282 |
| 6,694,025 B1 * | 2/2004 | Epstein et al. ................. 380/279 |
| 6,782,103 B1 * | 8/2004 | Arthan et al. .................. 380/278 |
| 8,443,358 B1 * | 5/2013 | Larkin et al. ................... 717/174 |
| 2003/0110376 A1 * | 6/2003 | Wiener et al. .................. 713/158 |
| 2004/0052377 A1 * | 3/2004 | Mattox et al. .................. 380/277 |
| 2005/0114862 A1 | 5/2005 | Bisdikian et al. |
| 2006/0115089 A1 * | 6/2006 | Carter et al. .................. 380/273 |
| 2006/0248082 A1 | 11/2006 | Raikar et al. |
| 2006/0291664 A1 * | 12/2006 | Suarez et al. ................. 380/286 |
| 2007/0116269 A1 * | 5/2007 | Nochta ........................ 380/30 |
| 2007/0186281 A1 * | 8/2007 | McAlister ..................... 726/14 |
| 2008/0123842 A1 * | 5/2008 | Pohja ............................. 380/44 |
| 2009/0300607 A1 * | 12/2009 | Ferris et al. ..................... 718/1 |
| 2011/0179162 A1 * | 7/2011 | Mayo et al. .................... 709/224 |
| 2012/0131594 A1 * | 5/2012 | Morgan ......................... 718/105 |
| 2012/0173728 A1 * | 7/2012 | Haskins et al. ................ 709/226 |

FOREIGN PATENT DOCUMENTS

EP 2228720 A1 9/2010

* cited by examiner

*Primary Examiner* — Glenton B Burgess
*Assistant Examiner* — Imran Moorad
(74) *Attorney, Agent, or Firm* — Schwegman Lundberg & Woessner, P.A.

(57) ABSTRACT

Apparatus, systems, and methods may operate to receive a public key associated with a public/private key pair at a key distribution handler, after a new workload and an associated key agent are created within a network of nodes. The associated key agent may be used to generate the key pair. Additional activity may include distributing, by the key distribution handler, the public key to other key agents associated with permitted workloads operating in the network. The public key may be used to overwrite or delete prior public keys for an authenticated workload identity associated with the new workload. Additional apparatus, systems, and methods are disclosed.

18 Claims, 4 Drawing Sheets

DYNAMIC KEY MANAGEMENT

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to all example code and/or pseudo-code described below, and in any drawings appended hereto: Copyright 2011 Novell, Inc. of Waltham, Mass.—All Rights Reserved.

BACKGROUND

As computing networks increase in size, the number and distribution of available resources (e.g., computing and storage resources) becomes more varied. While network growth can provide an improvement in processing power, it can also make the efficient and secure management of encryption keys more difficult.

When a new workload is cloned, the clone may be allocated a specific Internet Protocol (IP) address. Sometimes a public key is generated, which may be used as part of secure shell (ssh) network protocol data exchange sessions. When another network node (e.g., a local ssh client) connects to the new workload, the node will match the IP address assigned to the workload with the public key and place it in the known_hosts file (e.g., assuming the LINUX operating system is used). As workloads are removed from and added to the network, previously-allocated IP addresses (and their associated public keys) may be mapped to new workloads. Connecting client nodes may then flag this situation as a possible security issue, even when there is no problem.

Other difficulties may arise. For example, if a new server is brought into the network, with a key to a previously-existing network server having the same IP address, a new key will need to be manually transferred between the new server and the node that connects to it. As servers are created and destroyed, transferred keys might be stolen and used to spoof other servers on the network.

Problems may also occur when connecting one virtual machine (VM) to another. For example, when a new VM is created on a network, there is sometimes no way to know whether certain workloads are legitimately associated with the new VM, or whether they have been taken from a hijacked, compromised VM.

SUMMARY

In various embodiments, apparatus, systems, and methods that support dynamic key management are provided. Keys are mapped dynamically to workloads, as the workloads are created and destroyed. In this way, duplicate address assignments and unnecessary key transfers can be avoided.

For example, in some embodiments, dynamic key management is implemented by receiving a public key associated with a public/private key pair at a key distribution handler, after a new workload and an associated key agent (that generates the key pair) are created within a network of nodes. Additional activity may include distributing, by the key distribution handler, the public key to other key agents associated with permitted workloads operating in the network. The public key may be used to overwrite or delete prior public keys for an authenticated workload identity associated with the new workload.

In some embodiments, dynamic key management is implemented by receiving a newer public key associated with a public/private key pair, by an older key agent associated with an older workload operating within a network of nodes, where the older key agent has a lifetime substantially the same as the older workload. The activity of receiving may occur when transmission is permitted by a policy governing key distribution for a newer workload, after the newer workload and an associated newer key agent (to generate the newer public key in the key pair) are created within the network. Additional activity may include deleting, by the older key agent, an older public key associated with a prior workload identity that matches an authenticated workload identity associated with the newer workload. Additional embodiments are described, and along with the foregoing examples, will be set forth in detail below.

DETAILED DESCRIPTION

To address some of the challenges described above, as well as others, various embodiments may use newly-created workloads to automatically configure and distribute keys to associated workloads via key agent, identity, and policy decisions. Thus, as workloads appear and disappear on the network, the associated encryption keys are distributed dynamically.

This mechanism for dynamic key management enables information technology (IT) organizations to manage computing resources in a policy-driven, secure manner across physical, virtual, and cloud computing architectures to deliver business services to end users. While those of ordinary skill in the art are well-aware of conventional key distribution mechanisms, and how workloads operate within a cloud-based architecture, others may refer to European Patent Application EP 2228720A1 to learn more about the subject.

For the purposes of this document, "workloads" may comprise physical machine workloads (e.g., desktops, laptops, servers, cellular telephones, switches, routers, other independent computing devices (e.g., network-capable video cameras), etc.), or virtual machine workloads (e.g., a virtual machine, or a hypervisor). Workloads may be configured to communicatively couple to a network, such as the Internet (e.g., physical and virtual nodes). In some embodiments, workloads may comprise integrated stacks of applications, and/or middleware, and/or operating systems.

Figure 1:
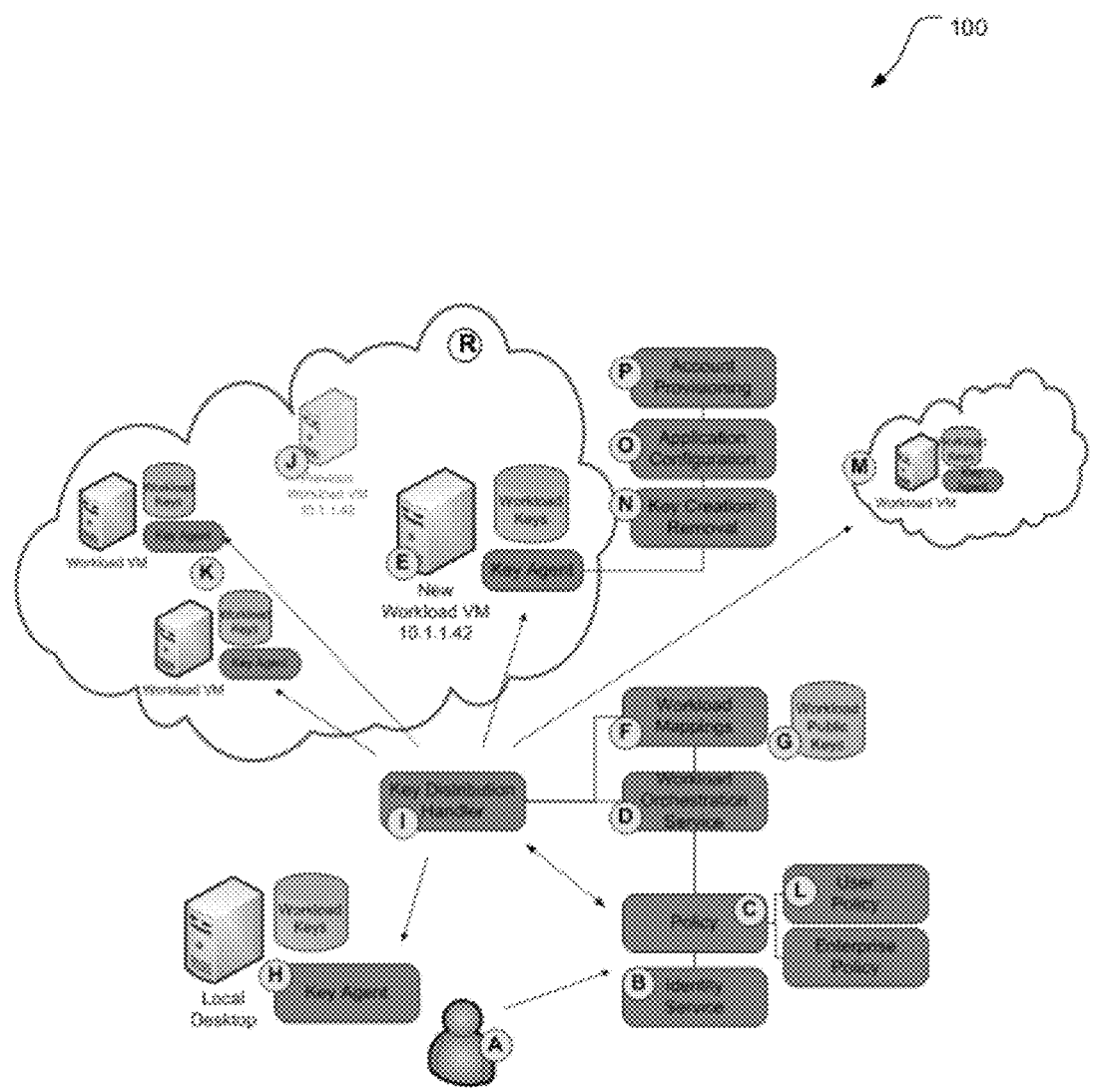
FIG. 1 illustrates a network that includes workloads operating according to various embodiments of the invention.

FIG. 1 illustrates a network 100 that includes workloads operating according to various embodiments of the invention. For example, in some embodiments, the process of dynamic key management may begin with connecting a user A operating a computing device H to the network 100 to initiate creation of a new workload E. The device H may operate to authenticate the user A to an identity service B to validate user credentials and receive an assigned identity to be used throughout the process to make it easier to determine which device (and user) is involved in accessing which resources.

A user identity to be associated with user A is established by validated credentials (e.g., username and password, a thumbprint, a certificate, or some combination of such mechanisms, among others). A workload identity to be associated with the device H may comprise the identity of a physical or virtual device (e.g., an IP address, perhaps in conjunction with a media access control (MAC) address, a domain name service (DNS) name, and/or an encryption key).

A policy C can be accessed to determine authorization requirements. For example, the policy may regulate the ability to create workloads and manage keys, including the distribution of keys to permitted workloads.

A Workload Orchestration Service (WOS) D may thus be notified that a new workload E should be created. The WOS D can determine, based on the policy C, what workloads the user A associated with the device H will be allowed to create.

For example, user A might be allowed to create a new workload E, with an associated key pair, if permitted by policy C. The public key from the key pair may be added to the identity of user A.

As other workloads K are created, workloads E already associated with user A can be identified. The key distribution handler I can be used to distribute the key for each new workload to the workload key agents that are already assigned to the same user A identity, according to a map and the policy C.

For example, if a second workload is created in a private cloud, and the first workload exists in a public cloud, the policy C may not permit the workload key associated with the second workload (private) to be sent to the first workload (public). However, in many embodiments, keys are distributed in both directions, such as from the first to the second workload, and from the second to the first workload, as long as the policy C permits bidirectional distribution. For this reason, the key distribution handler I typically operates to check the policy C for every accessible user and workload to determine whether a new key can be pushed to the key agents of individual, accessible workloads.

Thus, the WOS D in this example may create a new workload E, and install a key agent that can communicate with the key distribution handler I. Individual key agents can be associated with any type of workload E, H, K, M that exists within, or outside of the network 100.

When the workload E is created, the associated key agent will then generate a private/public key pair. For example, the user A associated with the device H may elect to create a Linux® enterprise server instance as the workload E. The installed, associated key agent will then operate to generate a new key pair and determine which application will be using the public key from the pair. If the device identity assigned to the workload E already exists (e.g., from a prior workload that has been removed from the network 100), the ssh keys to be used in the corresponding ssh daemon (sshd) application will be overwritten with the new public key.

In many embodiments, web servers and other applications are "configured" on a workload machine, so as to make use of the unique public key generated by a key agent. In this way, duplicate network addresses are not mistakenly associated with a defunct workload, such as one that has been resurrected by a hacker. Thus, the new key agent can operate to notify the key distribution handler I when key generation and application configuration are complete. The key agent can then pass the new public key in a generated key pair to the key distribution handler I so that the public key can be copied over to the key agents of permitted workload instances.

At this point, the key distribution handler I creates a workload map F and stores the new public key, perhaps in a storage node G, such as a node G that includes a secured database in a vault on a server running the key distribution handler I. The map F can be used to associate public keys, workloads, and users. The key distribution handler I can thus use the map F when it communicates with new key agents to determine, for each new workload, which keys can be distributed to which existing workloads, as permitted by the policy C.

Once a new public workload key has been added to the user identity assigned to user A, all other permitted workloads can receive the new key. The key distribution handler I can thus operate to distribute the new public key to each of the key agents associated with those workloads that are assigned to the same user identity.

The device H associated with the user A may comprise any type of computing device H, such as a laptop or desktop computer. This device H is also associated with its own key agent. The key distribution handler I can thus operate to notify the key agent of device H that a new public key has been assigned to a new workload E. The key distribution handler I can give the key agent associated with device H the new public key and request the key agent to either overwrite or delete any previous keys for device H that might be associated with a duplicate device identity (e.g., perhaps identified by a duplicate specific IP address and domain name system (DNS) name).

For an example of this operation, assume that a previously-existing VM workload J was assigned an identity that included an IP address of 10.1.1.42, which turns out to be the same as the IP address forming the identity assigned to the newly created workload E. Previously, the key agent associated with device H stored the public key of the workload J when the workload J was created. Thus, when the key distribution handler I notifies the key agent associated with the device H of the existence of a new key associated with a duplicated IP address, the key agent associated with the device H will operate to remove the previous key associated with that IP address by overwriting it with the new key. Thereafter, when the user A connects to the new workload E with the device H, the new key will be used. No false warning will be issued to assert that the key has been changed, or corrupted (e.g., due to tampering), as might occur in conventional key distribution systems.

In addition, the device H associated with the user A can trust the new workload E. The user A is aware that a new VM was cloned (e.g., as the new workload E), and that it was assigned a specific key. Thus, if the new VM represented by the workload E was compromised in reality, or the associated IP address was spoofed, a credible warning would appear to notify the user of a possible problem. In this way, the user A can trust that the VM was created as a new workload, and that the associated keys have been dynamically updated for use by the device H—so that the updated keys are used only when the device H is connected to the correct VM.

Workloads K represent additional workloads that are associated with the user A, and that are currently active in the same cloud R. When public keys are distributed to/from the additional workloads K, the key distribution handler will operate to check for the existence of policies L, such as user policies associated with user A, and enterprise policies. Thus, numerous policies may be used to limit where public keys can be distributed (e.g., pushed out to the key agents of permitted workloads) after they are created.

In the prior example, the enterprise policy permits key agents associated with the workloads K to be updated with a new public key associated with the workload E. This means the devices represented by the workloads K can connect to the new workload E, and the workloads K can trust that the correct public key will be used to validate their connection to the workload E as the correct VM server.

To continue the example, assume that the user A has created a workload that operates within an external cloud M. The map F would then include the workload in the cloud M as part of the workload mapping for user A. When the new workload E is created, the key distribution handler checks all existing policies L, including the enterprise policy, and determines that new keys are not allowed to be pushed to workloads that exist as part of external clouds. That is, the workloads in external clouds are not considered to be permitted workloads. In this case, the key agent associated with new workload E will be denied any request to push a public key to workloads operating within the cloud M.

User policies and enterprise policies (collectively, policies L) may each have a different scope. User policies, which may be created by administrators and/or users (depending on the particular implementation), might be stored on a laptop or desktop, or at the identity service on a server. Enterprise policies may be created and modified by enterprise administrators, and may be enforced against one or more users within the enterprise. Thus, an enterprise policy may preempt permissions granted by a user policy. A map F may indicate the possibility of key distribution, but policies L usually control the reality of key distribution.

As workloads are removed and destroyed, the key distribution handler I can request all key agents to remove public keys associated with removed/destroyed workloads. This helps prevent spoofing and other surreptitious activities that may be attempted within the infrastructure, using the identities of newly-removed machines, for example.

Key agents can manage key generation/removal activity N, automatic application configuration O (to enable the use of new keys and/or mutual authentication), and account provisioning P. When a new workload E is created as a VM for example, the associated key agent can be contacted to provision local user accounts on the new VM. The account might be a new account, or the same account that was used for login by the user A.

In many embodiments, the public key for every workload is stored. Thus, the key agent for each new workload may use its newly-generated public key to perform mutual authentication with all other connecting machines in some cases. For example, this might occur when all machines are configured to permit only mutual authentication. And since each machine has access to the public keys of all other trusted machines, relatively instant, dynamic access is provided as soon as a new machine is provisioned by the WOS D.

It should be noted that while ssh has been described as a potential application for various embodiments, this is by no means a limitation. Many embodiments can be used in conjunction with an encryption key framework, where associated key agents operate to configure applications using dynamic key management as described herein. Thus, additional embodiments may be realized.

Figure 2:
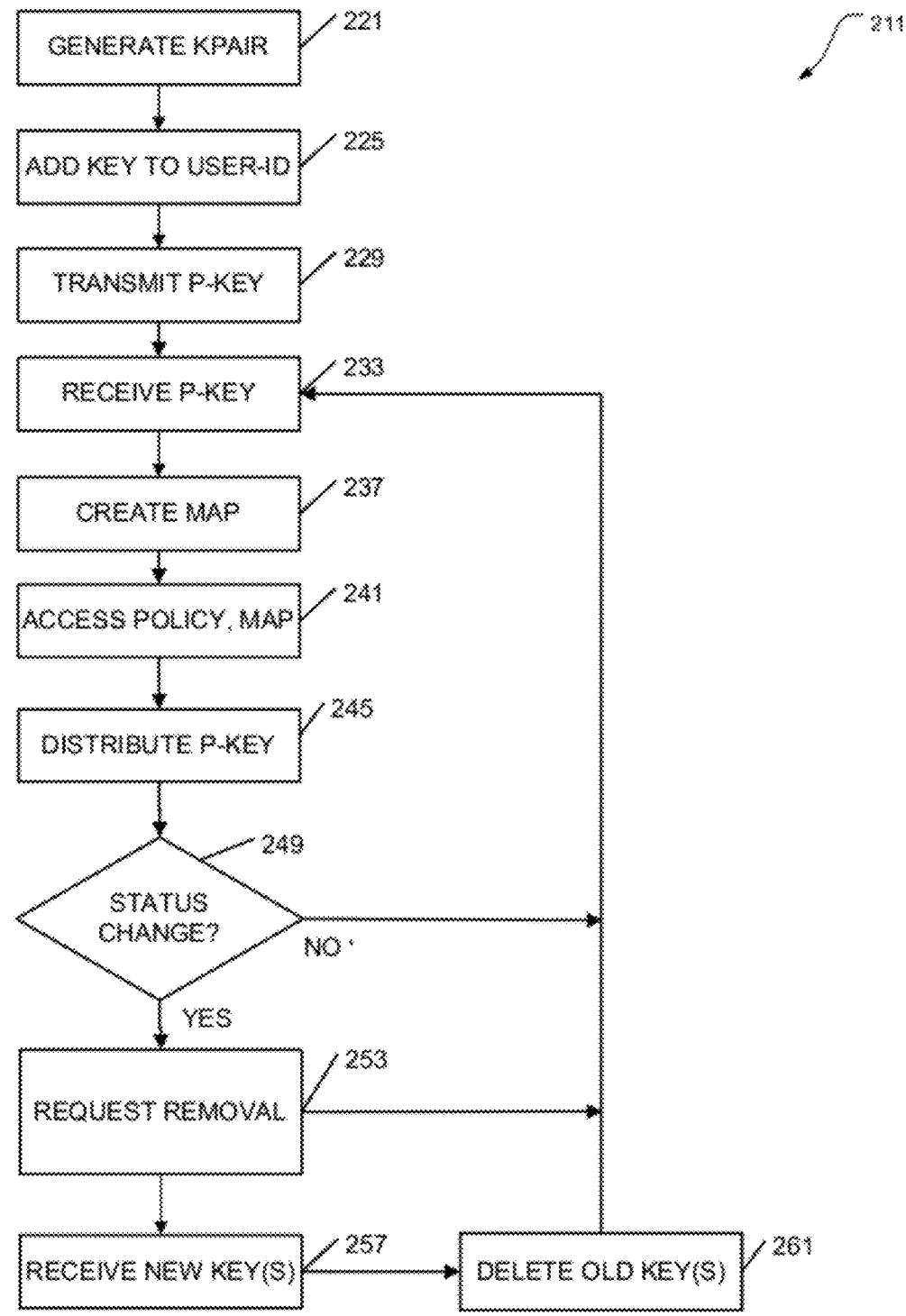
FIG. 2 is a flow diagram illustrating methods of implementing dynamic key management according to various embodiments of the invention.

For example, FIG. 2 is a flow diagram illustrating methods 211 of implementing dynamic key management according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

The elements of this process, as viewed by the key distribution handler, might include the distribution of keys that are generated by key agents associated with new workloads as the new workloads appear. When workloads disappear, or when operational problems are identified, their keys (and associated agents) are destroyed. Potential public key distribution locations are identified by a map. Permitted distribution locations (which may be a subset of the potential distribution locations) can be defined by one or more policies. "Permitted workloads" for the purposes of this document, are defined as workloads authorized by all operational policies to receive public keys that have been generated in association with the creation of a new workload.

Operational policies may include personal user policies, enterprise policies, and an enterprise policy controlling a personal policy, among others. For example, a policy might permit distribution of the public key for a newly-created workload "to all machines in my private cloud", or "to my laptop, but not to the public cloud". In another case, the policy might permit distribution "to all machines identified with me, but not outside the enterprise network" or "only to specific machines that have a specific role", such as a first financial server load that is balanced with a second financial server, such that the associated keys are only sent "to devices associated with officers of the same bank" In still other cases, when a confidential workload server appears on the network, its associated public key might only be distributed "to devices that are operated by persons with administrator roles."

Many other possibilities exist. In each case, as new workloads appear, the associated public key can be distributed to other key agents, based on one or more policies via the key distribution handler, such that those key agents are associated with permitted workloads.

Thus, in some embodiments, a processor-implemented method 211 that can be executed on one or more processors that perform the method may begin at block 221 with the generation of a new public-private key pair by a key agent associated with a newly-created workload.

The public key in the pair can be added to a user identity associated with the new workload. This is useful because the public key is specifically assigned to that user's identity. No one else can access this public key except the person who can validate they are the person/identity that should be associated with a particular user account. Thus, the method 211 may continue on to block 225 with adding the public key to a user identity associated with the new workload.

The method 211 may continue on to block 229, with transmitting the public key associated with the public/private key pair to a key distribution handler, as described previously. Thus, the method 211 may include, at block 233, receiving the public key at the key distribution handler, after a new workload and an associated key agent are created within a network of nodes (where the associated key agent operates to generate the key pair).

A map of potential public key distribution locations may be created, perhaps by the key distribution handler. Thus, the method 211 may continue on to block 237 to include creating a map to store a record of the relationship between the public key and the new workload (and/or the user that created the workload, and/or the device being operated by the user).

The map can be used to guide distribution of the public key. The set of workloads that can potentially receive the public key is usually the same size or larger than the set of workloads that are permitted (by policy) to receive the public key. Thus, the method 211 may include, at block 241, accessing the map to determine potential workloads for public key distribution, the potential workloads including all permitted workloads.

One or more policies can be used to narrow the scope of public key distribution, so that actual distribution of the public key is to a smaller set of workloads than what might otherwise be possible according to the map of all known workloads and their associated keys. Thus, the activity at block 241 may include accessing a policy, by the key distribution handler, to determine limitations on the distribution of the new public key. The permitted workloads may thus be defined in some embodiments by at least one of a user policy or an enterprise policy. The enterprise policy may be configured to control the user policy when both policies are in use.

The method 211 may continue on to block 245 with distributing (e.g., pushing), by the key distribution handler, the public key to other key agents associated with permitted workloads operating in the network. The public key may be used to overwrite or delete prior public keys for one or more authenticated workload identities associated with the new workload.

The activity of distributing may further include distributing the public key associated with the new workload, where the workload comprises one or more of a VM workload, a physical machine workload, and/or a workload configured to couple to the network.

Public keys can be distributed outside the network, if the operational policy permits. Thus, the activity of distributing may further include distributing, by the key distribution handler, the public key to all other workload key agents associated with permitted workloads operating outside of the network.

Distribution of the public key can be limited to key agents associated with a given user identity. Thus, the other workload key agents to which the public key is distributed may be limited to those agents associated with a user identity that is identical to the user identity associated with the new workload.

Workload status changes can result in the removal of all records associated with the workload public key, such as when the workload status becomes "untrusted", meaning that a specific security event has been indicated (e.g., a multiplicity of login attempts), or some other kind of anomalous operation is detected. Thus, the method 211 may operate to determine whether a status change has occurred at block 249.

If no status change has occurred, as determined at block 249, then the method 211 may return to block 233. If a status change has occurred, then the method 211 may include, at block 253, requesting that other workload key agents operate to remove corresponding records of the public key in response to the status of a particular workload changing from trusted to removed, destroyed, or untrusted, among others. Still further embodiments may be realized.

For example, some embodiments, as viewed by an existing key agent, operate to generate a new public-private key pair when an associated workload is created. Keys associated with new workloads are received (when permitted), and keys associated with defunct workload identities are deleted.

Thus, the method 211 may comprise, at block 257, receiving a newer public key associated with a public/private key pair, by an older key agent associated with an older workload operating within a network of nodes. The older key agent may have a lifetime that is substantially the same as the older workload, and the activity of receiving may occur when transmission is permitted by a first policy governing key distribution for a newer workload after the newer workload and an associated newer key agent are created within the network (where the newer workload key agent operates to generate the key pair).

In some embodiments, two-way key distribution may occur, as permitted by the governing policies. Thus, the method 211 may also include, at block 257, transmitting by the older key agent, an older public key to the newer key agent when permitted by a second policy governing key distribution for the older workload associated with the older key agent.

Public keys may be pushed to the active key agents in the network. Thus, the activity of receiving at block 257 may occur in response to pushing the newer public key to the network, under control of the key distribution handler to control distribution of all public keys associated with all of the nodes (both inside and outside the network).

The method 211 may continue on to block 261 to include deleting, by the older key agent, an older public key associated with a prior workload identity that matches the authenticated workload identity associated with the newer workload. In some cases, the authenticated workload identity comprises an IP address, along with a MAC address or a security key. Thus, the authenticated workload identity may include an IP address that duplicates an IP address forming part of a previously-existing workload identity.

The methods described herein do not have to be executed in the order described, or in any particular order. Moreover, various activities described with respect to the methods identified herein can be executed in repetitive, serial, or parallel fashion. The individual activities of the methods shown in FIG. 2 can also be combined with each other and/or substituted, one for another, in various ways. Information, including parameters, commands, operands, and other data, can be sent and received in the form of one or more carrier waves.

The methods of dynamic key management shown in FIG. 2 can be implemented in various devices, as well as in a computer-readable storage medium, where the methods are executed by one or more processors. Further details of such embodiments will now be described.

Figure 3:
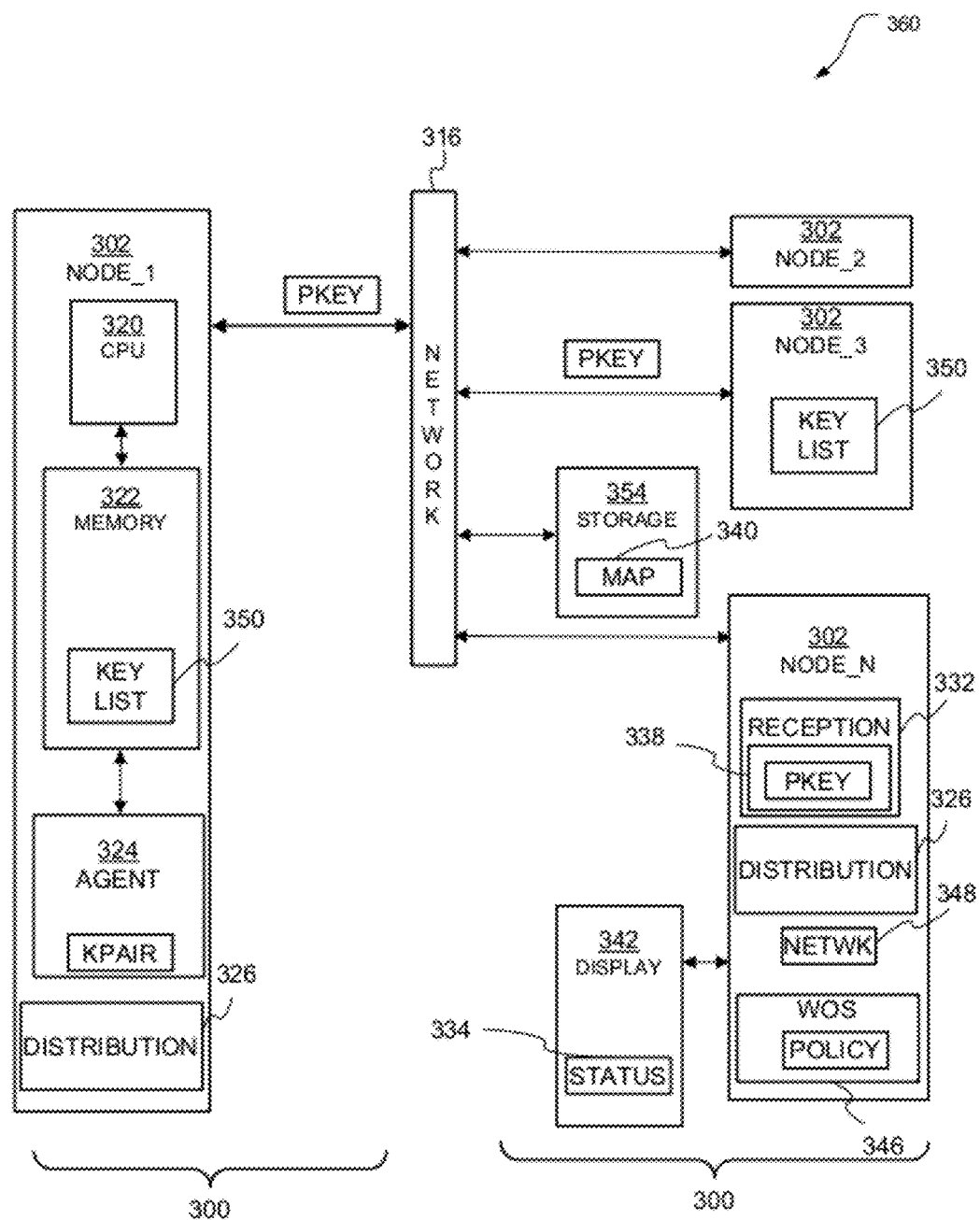
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement dynamic key management may comprise one or more processing nodes 302, one or more processors 320, memories 322, key agents 324, and distribution modules 326. In some embodiments, the apparatus 300 may comprise reception modules 332, a WOS 346, and network interfaces 348. Some embodiments of the apparatus 300 may comprise one or more storage nodes 354.

In some embodiments, the apparatus 300 may comprise one or more displays 342. The apparatus 300 may comprise a server, a client, or some other networked processing node.

The processing nodes 302 may comprise physical machines or virtual machines (VMs), or a mixture of both. The nodes 302 may also comprise networked entities, such as servers and/or clients. In some implementations, the operations described can occur entirely within a single node 302. It should be noted that any one of the nodes 302 may include any one or more of the elements, including multiple ones of any element, explicitly shown in any other one of the nodes NODE_1, NODE_2, ..., NODE_N.

In some embodiments then, an apparatus 300 may comprise a node (e.g., NODE_3) that operates as a server, such as a key distribution handler server, including a network interface 348 to communicatively couple to a network 316. The apparatus 300 may further comprise a reception module 332 to receive a public key PKEY associated with a public/private key pair KPAIR, after a new workload (e.g., NODE_1) and an associated key agent 324 are created within the network 316, the associated key agent 324 having generated the key pair KPAIR. In some embodiments, the apparatus 300 may comprise a distribution module 326 to distribute the public key PKEY, via the network interface 348, to other workload key agents 324 associated with permitted workloads (e.g., NODE_N) operating in the network 316. The public key PKEY may be used to overwrite or delete prior public keys in a key list 350 for an authenticated workload identity associated with the new workload.

The apparatus 300 may be coupled to a display that is used to display the status of keys PKEY that have been distributed. Thus, the apparatus 300 may further comprise a display 342 to display key distribution status 334 with respect to permitted workloads.

The apparatus 300 may be coupled to a storage node. Thus, the apparatus 300 may further comprise a storage node 354 to couple to the network 316 and to store a map 340 defining potential distribution locations for the public key PKEY within the network 316.

In some embodiments, the apparatus 300 may comprise a secure key vault 338 to store the public key PKEY. In some embodiments, the apparatus 300 may comprise a WOS 346 to control operation of the distribution module 326 according to one or more policies 346 and a map 340 defining potential distribution locations for the public key PKEY, both within and outside of the network 316. Still further embodiments may be realized.

For example, it can be seen that a system 360 that operates to implement dynamic key management may comprise multiple instances of the apparatus 300. The system 360 might also comprise a cluster of nodes 302, including physical and virtual nodes.

In some embodiments then, a system 360 can operate using one or more nodes 302. That is, a system 360 may comprise a plurality of first nodes (e.g., NODE_1 and NODE_N) each associated with its own key agent 324, and at least one second node (e.g., NODE_3) operating as a key distribution handler. That is, the system 360 may comprise a plurality of first nodes 302 operating within a network 316, each of the first nodes 302 comprising an associated key agent 324 to generate a public/private key pair KPAIR in conjunction with creation of an associated workload operating on the network 316.

The system 360 may further comprise a second node 302 that includes a network interface 348 to communicatively couple to the network 316, as well as a reception module 332 to receive a public key PKEY associated with the public/private key pair KPAIR, after the associated workload is created. The second node 302 may further comprise a distribution module 326 to distribute the public key PKEY, via the network interface 348, to the associated key agent 324 of at least one of the first nodes 302 when distribution is permitted by a policy POLICY. The second node 302 may comprise a secure key vault 338 to store the public key PKEY. The second node 302 may further comprise a WOS 346. The WOS 346 may operate as previously described.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302, including application information, policy information, resource allocation, and/or key distribution status 334 throughout the network 316.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
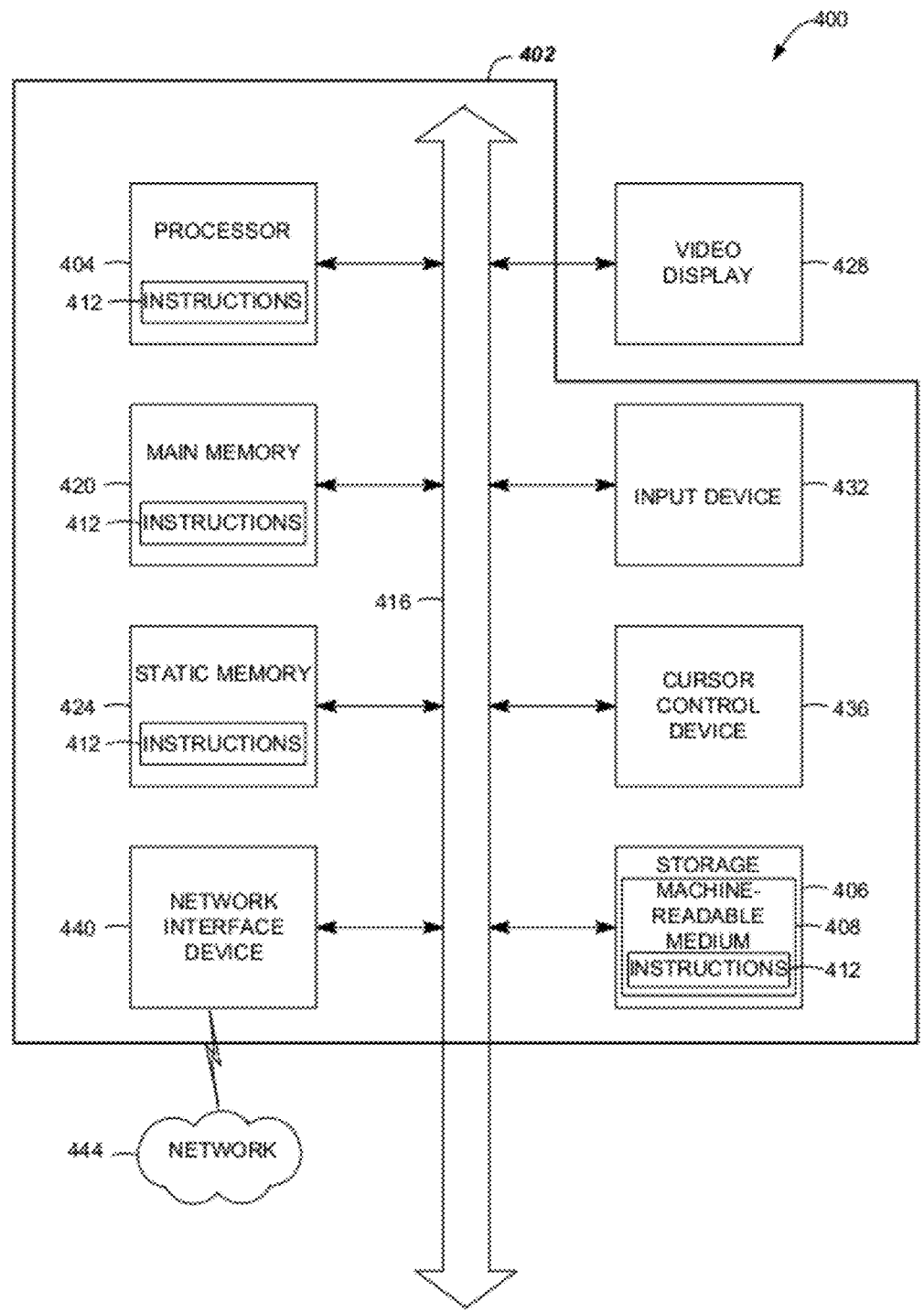
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to dynamically manage keys (e.g., key generation, distribution, and removal) as workloads are created and destroyed. Near-instant access may thus be provided to a cloned workload in some embodiments, without having to know the actual username/password as authentication, when mutual authentication is performed between workloads. Thus, keys do not have to be manually transferred. Keys may also be dynamically distributed to all workloads assigned to the same user identity according to one or more policies. Increased network operational efficiency, and user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus that is a key distribution handler, the apparatus comprising:
    a network interface to communicatively couple to a network, the network including a plurality of nodes respectively including workloads, each of the workloads including respective key agents, the respective key agents having generated respective key pairs for the respective workloads, the respective key agents having lifetimes substantially the same as the respective workloads;
    a processor implemented reception module arranged to:
        receive a notification from a new respective key agent on a new workload that key generation and application configuration to make use of a generated public/private key pair is complete, the new respective key agent having generated the public/private key pair, the generated key pair including a public key, the newly created workload being created by and assigned to a user in accordance with a policy:
        receive the public key in response to the notification from the new respective key agent; and
        assign the public key to the user, and
    a processor implemented distribution module arranged to distribute the public key, via the network interface, to a plurality of the respective key agents associated with a plurality of permitted workloads from the workloads operating on nodes in the network, wherein the public key is used to overwrite or delete prior public keys for an authenticated workload identity associated with the new workload, wherein the permitted workloads are assigned to the user and governed by the policy, and wherein the apparatus is a separate and distinct node from a node with the new respective key agent and nodes with the respective key agents.

2. The apparatus of claim 1, further comprising:
    a display to display key distribution status with respect to the permitted workloads.

3. The apparatus of claim 1, further comprising:
    a storage node to couple to the network and to store a map defining potential distribution locations for the public key within the network.

4. A system, comprising:
    a plurality of first nodes operating within a network, each of the first nodes comprising respective key agent to generate respective public/private key pairs in conjunction with creation of respective workloads operating on the network the respective key agents having lifetimes substantially the same as the respective workloads; and
    a second node that is separate and distinct from the plurality of first nodes, the second node being a key distribution handler, the second node comprising:
        a network interface to communicatively couple to the network;
        a processor implemented reception module, the reception module arranged to:
            receive a notification from a new respective key agent on a new workload that key generation and application configuration to make use of a generated public/private key pair are complete, the new respective key agent having generated the public/private key pair, the generated key pair including a public key, the newly created workload being created by and assigned to a user in accordance with a policy;

receive the public key in response to the notification from the new respective key agent; and assign the public key to the user, and a processor implemented distribution module arranged to distribute the public key, via the network interface, to the associated key agents of the plurality of first nodes when distribution is permitted by a policy and whether the user is assigned to a respective workload of the plurality of first nodes, wherein the public key is used to overwrite or delete prior public keys for an authenticated workload identity that identifies the new workload.

5. The system of claim 4, wherein the second node comprises a secure key vault to store the public key.

6. The system of claim 4, wherein the second node comprises a workload orchestration service to control operation of the distribution module according to the policy and a map defining potential distribution locations for the public key, both within and outside of the network.

7. A processor-implemented method for a key distribution handler to execute on one or more processors that perform the method in a the network including a plurality of nodes respectively including workloads, each of the workloads including respective key agents, the respective key agents having generated respective key pairs for the respective workloads, the respective key agents having lifetimes substantially the same as the respective workloads, the method comprising:

receiving a notification from a new respective key agent on a new workload that key generation and application configuration to make use of a generated public/private key pair are complete, the new respective key agent having generated the public/private key pair, the generated key pair including a public key, the newly created workload being created by and assigned to a user in accordance with a policy;

receiving the public key in response to the notification from the new respective key agent;

assigning the public key to the user; and distributing the public key to a plurality of respective key agents associated with a plurality of permitted workloads from the workloads operating on nodes in the network, wherein the public key is used to overwrite or delete prior public keys for an authenticated workload identity associated with the new workload, wherein the permitted workloads are assigned to the user and governed by the policy, and wherein the apparatus is a separate and distinct node from a node with the new respective key agent and nodes with the respective key agents.

8. The method of claim 7, wherein the distributing further comprises:

distributing the public key associated with the new workload comprising at least one of one of a virtual machine workload, a physical machine workload, or a workload configured to couple to the network.

9. The method of claim 7, further comprising:

requesting the respective key agents to remove corresponding records of the public key in response to a status of the new workload changing from trusted to removed, destroyed, or untrusted.

10. The method of claim 7, wherein the distributing further comprises:

distributing, by the key distribution handler, the public key to all other workload key agents associated with permitted workloads operating outside of the network.

11. The method of claim 7, further comprising:

creating a map to store a record of a relationship between the public key and the new workload.

12. The method of claim 11, further comprising:

accessing the map to determine potential workloads for the distributing, the potential workloads including all of the permitted workloads.

13. The method of claim 7, wherein the respective key agents are associated with a user identity that is identical to a user identity associated with the new workload.

14. The method of claim 7, wherein the olicy is a user olicy controlled by an enterprise policy when both policies are in use.

15. A processor-implemented method to execute on one or more processors that perform the method, comprising:

receiving, from a key distribution handler, a newer public key associated with a public/private key pair assigned to a user by the key distribution handler, by an older key agent, of a plurality of older key agents, associated with an older workload, of a plurality of older workloads, operating within a network of nodes, the older key agent having a lifetime substantially the same as the older workload, the receiving to occur when transmission is permitted by a first policy governing key distribution for a newer workload in response to creation of the newer workload and an associated newer key agent within the network, the newer workload key agent having:

generated the public/private key pair including the newer public key;

notified the key distribution handler that application configuration to make use of a generated public/private key pair is complete; and communicated the newer public key the key distribution handler; and deleting, by the older key agent, an older public key associated with a prior workload identity that matches an authenticated workload identity associated with the newer workload, wherein the other key agent is separate and distinct from other members of the plurality of older key agents and the newer key agent.

16. The method of claim 15, wherein the authenticated workload identity includes an internet protocol (IP) address that duplicates an IP address forming part of the prior workload identity.

17. The method of claim 15, further comprising:

transmitting, by the older key agent, an older public key to the newer key agent when permitted by a second policy governing key distribution for the older workload.

18. The method of claim 15, wherein the receiving occurs in response to pushing the newer public key to the network, under control of the key distribution handler to control distribution of all public keys associated with all of the nodes.

* * * * *

UNITED STATES PATENT AND TRADEMARK OFFICE
CERTIFICATE OF CORRECTION

PATENT NO.         : 8,948,399 B2                                    Page 1 of 1
APPLICATION NO.    : 13/118082
DATED              : February 3, 2015
INVENTOR(S)        : Sabin et al.

It is certified that error appears in the above-identified patent and that said Letters Patent is hereby corrected as shown below:

In the Claims

In column 12, line 29, in Claim 1, delete "policy:" and insert --policy;--, therefor In column 12, line 32, in Claim 1, delete "user," and insert --user;--, therefor In column 12, line 57, in Claim 4, after "network", insert --,--, therefor In column 13, line 10, in Claim 4, delete "user," and insert --user;--, therefor In column 13, line 60, in Claim 8, after "at least", delete "one of", therefor In column 14, line 20, in Claim 14, delete "olicy" and insert --policy--, therefor In column 14, line 20, in Claim 14, delete "olicy" and insert --policy--, therefor Signed and Sealed this
Second Day of June, 2015

Michelle K. Lee
*Director of the United States Patent and Trademark Office*